US012352852B2

(12) United States Patent
Lehotsky et al.

(10) Patent No.: US 12,352,852 B2
(45) Date of Patent: Jul. 8, 2025

(54) VEHICLE ROOF COMPRISING A MOUNT FOR AT LEAST TWO ENVIRONMENT SENSORS, THE MOUNT BEING ATTACHED TO A SUPPORT

(71) Applicant: Webasto SE, Stockdorf (DE)

(72) Inventors: Juraj Lehotsky, Stockdorf (DE); Thomas Podolski, Stockdorf (DE); Nikolaus Linner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 371 days.

(21) Appl. No.: 18/163,428

(22) Filed: Feb. 2, 2023

(65) Prior Publication Data

US 2023/0257022 A1    Aug. 17, 2023

(30) Foreign Application Priority Data

Feb. 14, 2022    (DE) .......................... 102022103422.4

(51) Int. Cl.
| | |
|---|---|
| *G01S 13/931* | (2020.01) |
| *B62D 25/06* | (2006.01) |
| *G01S 7/02* | (2006.01) |
| *G01S 17/931* | (2020.01) |
| *B60R 11/00* | (2006.01) |

(52) U.S. Cl.
CPC ............ *G01S 13/931* (2013.01); *B62D 25/06* (2013.01); *G01S 7/027* (2021.05); *G01S 17/931* (2020.01); *B60R 2011/004* (2013.01)

(58) Field of Classification Search
CPC ... B60R 11/00; B60R 11/04; B60R 2011/004; B60R 2011/0028; B62D 25/05; G01S 13/931; G01S 2013/9327; G01S 2013/93273; G01S 17/931
USPC .......................................................... 296/210
See application file for complete search history.

(56) References Cited

U.S. PATENT DOCUMENTS

| | | | |
|---|---|---|---|
| 10,071,773 B2* | 9/2018 | Williams | ............... B62D 35/00 |
| 10,099,630 B1* | 10/2018 | Krishnan | ............... G01S 7/4813 |
| 10,766,430 B2* | 9/2020 | Frederick | ............... B60R 11/00 |
| 10,800,346 B2* | 10/2020 | Taylor | ...................... B60J 10/90 |
| 11,813,992 B2* | 11/2023 | Huelsen | ................ G01S 17/931 |
| 11,851,106 B2* | 12/2023 | Huelsen | ................ B62D 25/06 |
| 11,922,920 B2* | 3/2024 | Huelsen | .............. B60W 60/001 |
| 2007/0216768 A1* | 9/2007 | Smith | ...................... B60R 11/04 |
| | | | 348/118 |
| 2017/0261273 A1* | 9/2017 | Maranville | ........... G01S 17/931 |
| 2018/0037267 A1* | 2/2018 | Williams | ............... G01S 7/4813 |
| 2018/0265019 A1* | 9/2018 | Dry | ...................... B60R 16/0231 |

FOREIGN PATENT DOCUMENTS

DE    102020202340 A1    8/2021

* cited by examiner

*Primary Examiner* — Dennis H Pedder
(74) *Attorney, Agent, or Firm* — Fitch, Even, Tabin & Flannery, LLP

(57) ABSTRACT

A vehicle roof, having a roof skin, which forms an visible exterior surface of the vehicle roof, and a sensor unit having at least two environment sensors for detecting a vehicle environment, the sensor unit being disposed below the roof skin and attached to a support and having a mount for the at least two environment sensors. Thermal decoupling members are disposed between the support and the mount.

13 Claims, 5 Drawing Sheets

VEHICLE ROOF COMPRISING A MOUNT FOR AT LEAST TWO ENVIRONMENT SENSORS, THE MOUNT BEING ATTACHED TO A SUPPORT

CROSS-REFERENCE TO RELATED APPLICATION

This application claims priority from German Patent Application Number DE 10 2022 103 422.4, filed Feb. 14, 2022, which is hereby incorporated herein by reference in its entirety for all purposes.

FIELD

The invention relates to a vehicle roof, in particular a vehicle roof for a passenger car, the vehicle roof comprising the features of the preamble of claim 1.

BACKGROUND

A vehicle roof of this kind is known from practice and is in particular configured as a roof module, which is a separate component placed on roof side rails and/or transverse roof rails, which are part of a vehicle body forming a vehicle carcass, when in the installed state. The vehicle roof comprises a roof skin, which forms a visible exterior surface of the vehicle roof and which is optically and geometrically adapted to the design of the vehicle in the ideal case. A sensor unit comprising at least two environment sensors for detecting a vehicle environment is disposed below the roof skin, the environment sensors being lidar sensors or the like and being part of a system enabling the vehicle in question to drive autonomously or semi-autonomously.

The two environment sensors can be disposed on a common mounting platform, which forms a mount for the environment sensors and which is placed on top of a roof frame. The roof frame thus forms a support of the vehicle roof, which can also support the roof skin.

The environment sensors need to be kept in a suitable temperature range in order to enable them to operate flawlessly. To this end, the environment sensors can be connected to a thermal management system, which cools them. However, there is the problem that the introduced cooling capacity unintentionally affects not only the environment sensors but also the support.

SUMMARY

Hence, the object of the invention is to provide a vehicle roof of the kind described above whose environment sensors can be operated under improved operating conditions.

According to the invention, this object is attained by the vehicle roof having the features of claim 1.

So the invention proposes a vehicle roof, in particular a vehicle roof for a passenger car, that comprises a roof skin, which forms a visible exterior surface of the vehicle roof, and a sensor unit having at least two environment sensors for detecting a vehicle environment. The sensor unit is disposed below the roof skin and attached to a support. Furthermore, the sensor unit comprises a mount for the at least two environment sensors. Thermal decoupling members are disposed between the support and the mount in order to be able to cool and/or heat the environment sensors in a defined manner without part of the energy expended for this purpose dissipating into the support.

The configuration according to the invention, i.e., the thermal decoupling of the support and the mount, allows the environment sensors to be brought to and kept at a suitable working temperature by coupling a thermal management system to the mount or directly to the environment sensors without there being the risk that the support absorbs the heating and/or cooling capacity introduced.

The mount can be considered a multi-functional mount for multiple environment sensors, via which the sensor unit is attached to the support. The support is preferably formed by a roof frame of the vehicle roof or by another attachment platform that is part of the vehicle according to the invention.

So multiple environment sensors can be integrated on the mount. Thus, these component can be pre-installed, allowing the entire sensor unit, which comprises the environment sensors and the mount, to be connected to the support during the final assembly.

In order to make the thermal decoupling between the mount and the support as effective as possible, the thermal decoupling members can comprise at least one bar formed on the mount and engaging a recess formed on a fixing element attached to the support.

The bar preferably has a diameter which is as small as possible relative to the dimension of the mount so as to keep heat conductance low. The bar can be a journal which enters the recess or a connecting portion between two areas of the mount that passes through the recess of the fixing element.

The bar is preferably in contact with the fixing element via a linear contact so as to keep the heat transfer as low as possible. This can be achieved in particular if the bar has a circular or oval cross section that differs from a cross section of the recess.

The bar can be secured in the recess by means of a securing plate, for example, in order to hold the bar in the recess. The securing plate can in turn be screwed or riveted to the fixing element.

The fixing element is preferably thermally insulated from the support in order to further improve the thermal decoupling between the mount and the support. For example, a gap, which can be an air gap or be filled with thermal insulation material, is formed between the fixing element and the support.

In a preferred embodiment of the vehicle roof according to the invention, the bar is disposed in the recess with one- or two-dimensional play in order to be able to compensate for a differing thermal expansion of the support and the mount.

In an advantageous embodiment of the vehicle roof according to the invention, the fixing element is made of a material having low thermal conductivity. In particular, the material can be a plastic material, which may be a polyamide material, which is in particular reinforced with glass fibers.

Preferably, a thermal management system connected to the mount is provided in order to be able to control the temperature of, i.e., cool, the environment sensors efficiently. The thermal management system can comprise what is referred to as heat pipes or heat conduction pipes, which are connected to the mount on one side and to a heat exchanger on the other side; the heat exchanger can be associated with the sensor unit in question only or with further components of the vehicle roof, such as another environment sensor. The environment sensors disposed on the mount can basically be of any type. For example, the environment sensors are cameras. Together, the cameras can be part of one or more than one stereo camera. Alternatively, the environment sensors can be radar sensors, lidar sensors, acoustic wave sensors, antennas and/or the like.

In a preferred embodiment of the vehicle roof according to the invention, the mount is a metallic cast part or milled part, which is in particular made of an aluminum material, so that the mount has high thermal conductivity and the temperature of the environment sensors can be controlled through the thermal management system connected to the mount.

As mentioned, the support can be a frame of the vehicle roof. The mount can be connected to the frame via the thermal decoupling members in a window-like recess of the frame. In particular, the mount can be connected to the frame from below.

In a preferred embodiment, the vehicle roof according to the invention is a roof module. In an integrated manner, such a roof module forms a structural unit in which components required for autonomous or semi-autonomous driving of the vehicle in question are incorporated. A plurality of functional elements can be integrated in the roof module. The roof module can be connected to a vehicle body or a vehicle carcass, which comprises roof rails, such as roof side rails and/or transverse roof rails, by a vehicle manufacturer. Thus, the roof module is what is referred to as a roof sensor module (RSM), which enables the vehicle in question to drive autonomously or semi-autonomously.

In an autonomous driving mode, a vehicle quipped with the vehicle roof according to the invention and configured for driving autonomously drives autonomously at least without substantial intervention of a driver. In a semi-autonomous driving mode, the vehicle roof according to the invention can be part of a driver assistance system.

The vehicle roof according to the invention can be provided with a transparent fixed roof portion and/or a roof opening system for a roof opening.

In particular, the vehicle roof according to the invention is a roof of a passenger car. However it is also conceivable for it to be a roof of a utility vehicle, such as a delivery van, a bus, an autonomously driving small bus, e.g., what is referred to as a people mover, or a tractor unit.

The invention also relates to a motor vehicle that comprises a vehicle roof of the kind described above and whose vehicle carcass is in particular provided with a roof module configured as a roof sensor module.

Other advantages and advantageous configurations of the subject matter of the invention are apparent from the description, the drawing and the claims.

BRIEF DESCRIPTIONS OF THE DRAWINGS

An exemplary embodiment of a motor vehicle having a vehicle roof according to the invention is schematically illustrated in the drawing and will be discussed in more detail in the following description.

DETAILED DESCRIPTION

Figure 1:
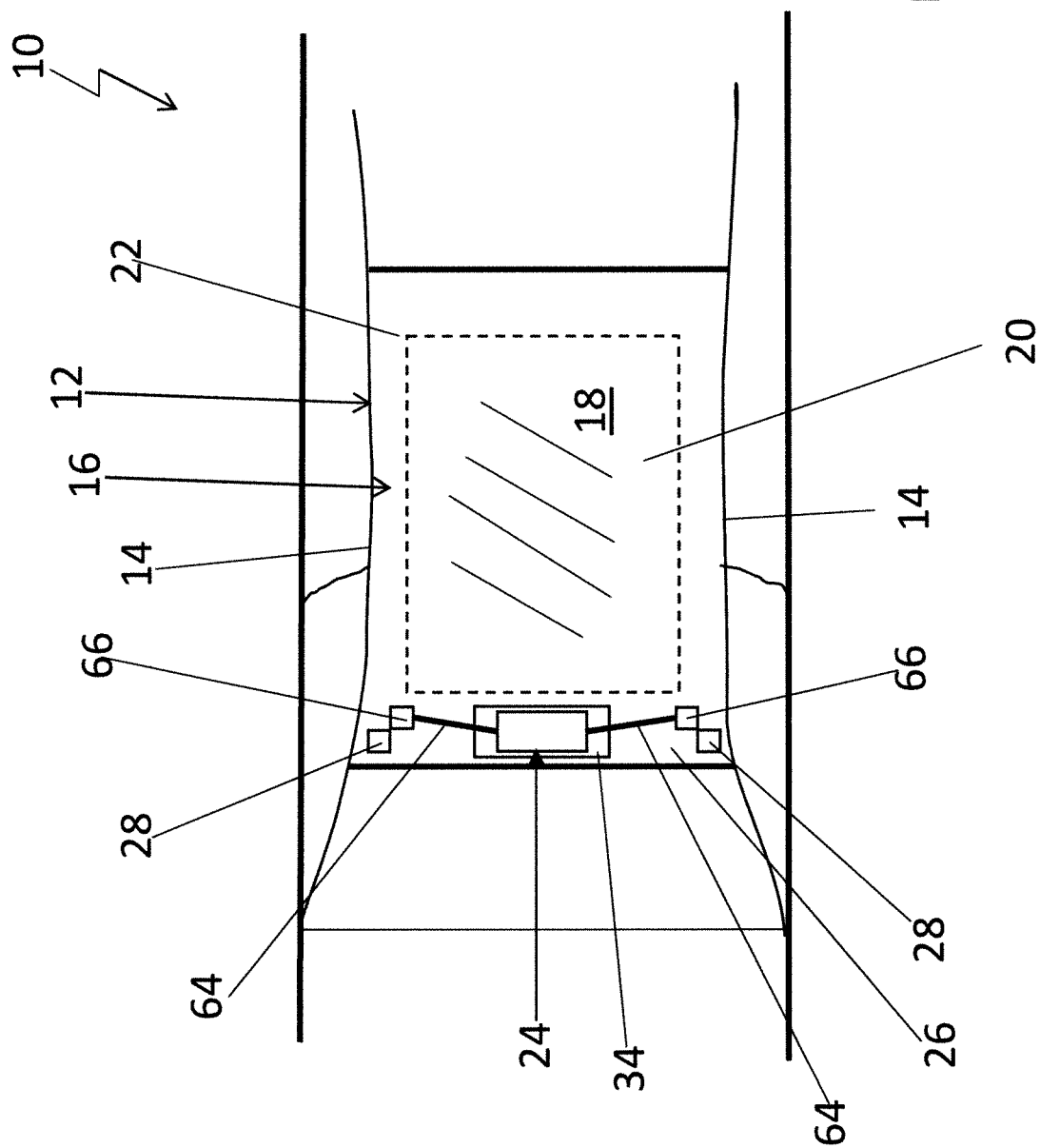
FIG. 1 is a top view of a motor vehicle having a vehicle roof according to the invention.
Figure 2:
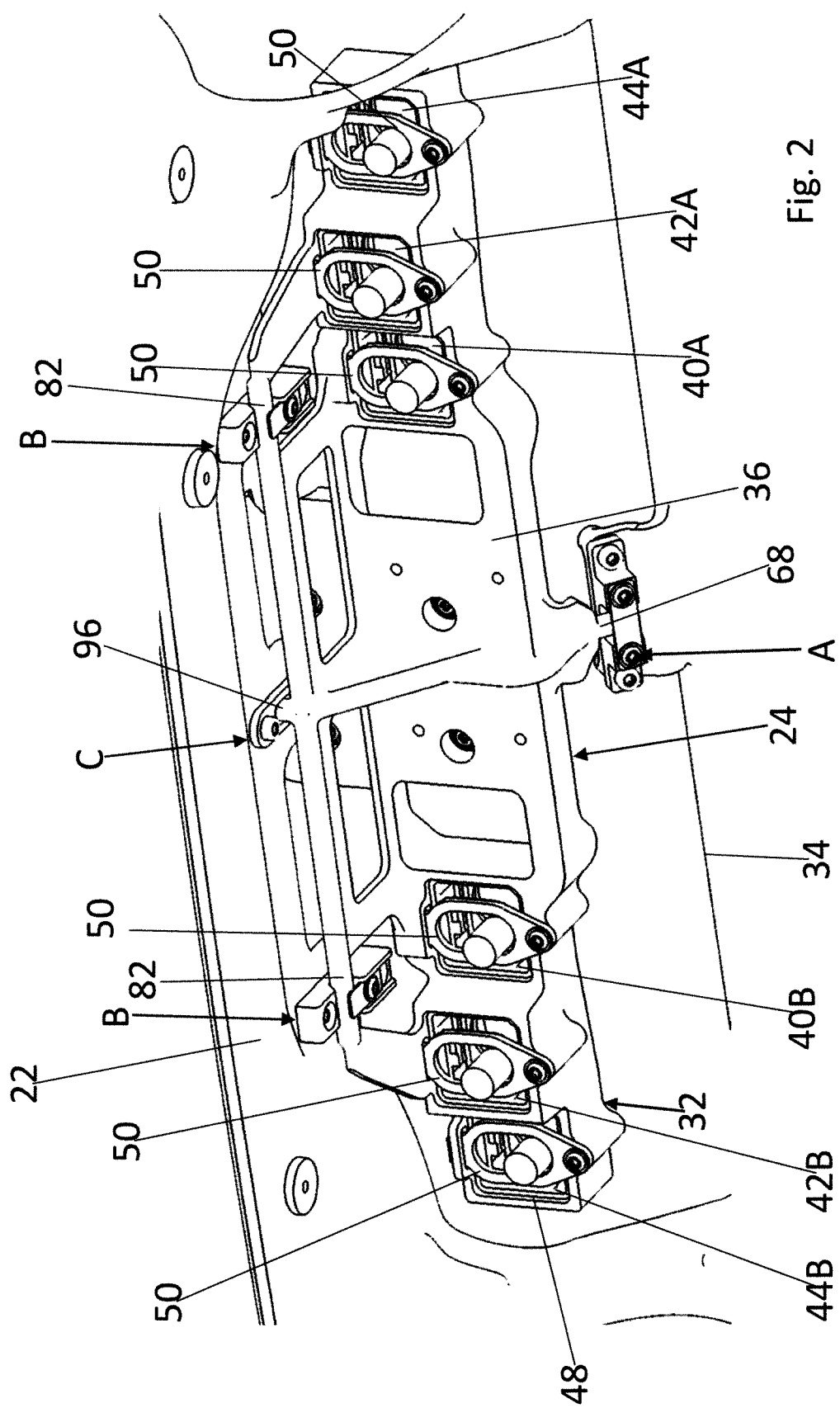
FIG. 2 is an interior view of a front frame part of a roof frame of the vehicle roof.
Figure 3:
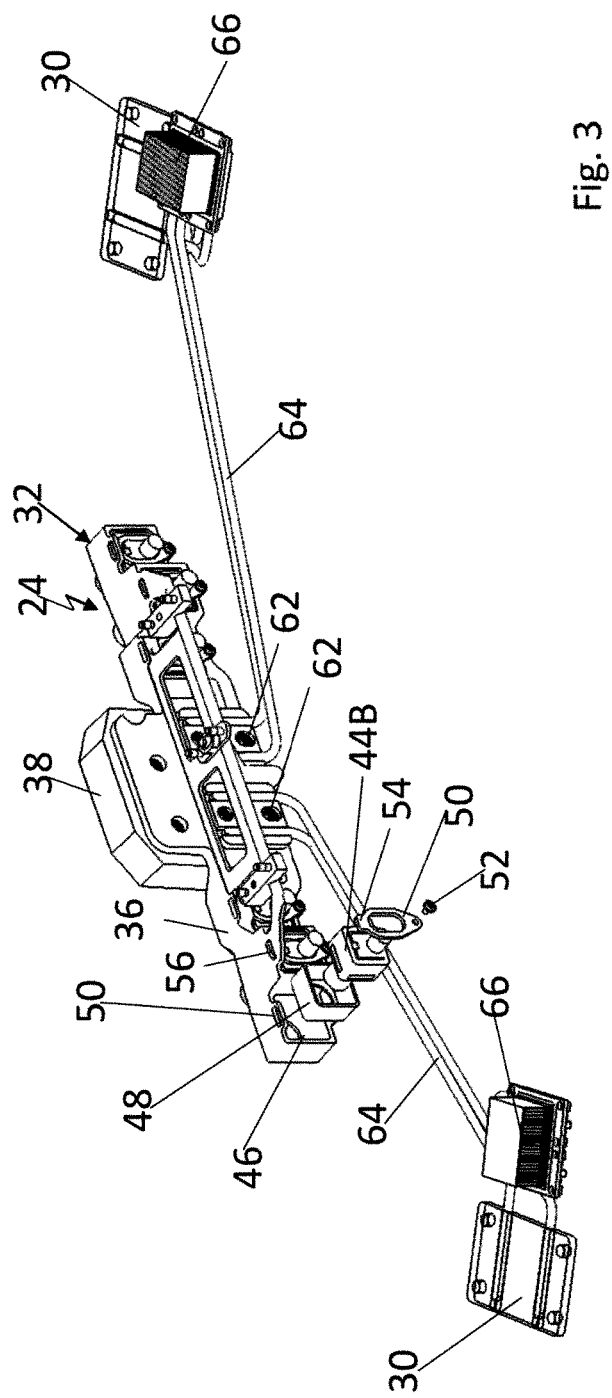
FIG. 3 is a rear view of a sensor assembly of the vehicle roof.
Figure 4:
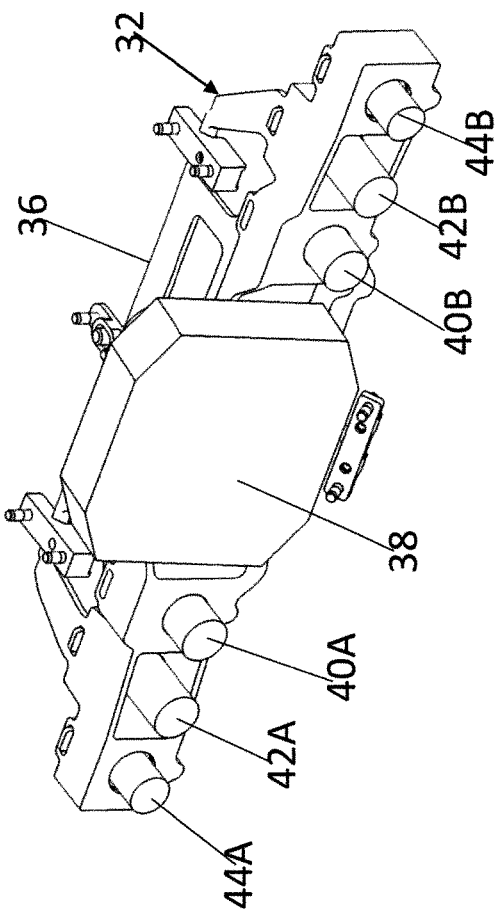
FIG. 4 is a perspective front view of a middle sensor unit of the sensor assembly.

The drawing shows a motor vehicle 10, which is configured as a passenger car and provided with a vehicle roof 12, which comprises a roof side rail 14 on either side of a longitudinal center roof plane, roof side rails 14 being part of a vehicle body, which is a vehicle carcass. A roof module 16, which covers a vehicle interior of motor vehicle 10, is attached to roof side rails 14, which form a carcass support structure.

Roof module 16 comprises a roof skin 18, which can form a transparent roof portion 20 in a central area, transparent roof portion 20 allowing light to enter the vehicle interior. Roof skin 18 is disposed on or attached to a circumferential roof frame 22, which is a support of roof module 16 and also forms an intersection between roof module 16 and the vehicle carcass.

Roof module 16 is configured as a roof sensor module (RSM) equipped with devices enabling motor vehicle 10 to drive autonomously. To this end, roof module 16 has a sensor system comprising a sensor assembly 24, by means of which the vehicle environment can be detected so that motor vehicle 10 can drive autonomously. A current traffic situation can be determined by evaluating the measurement signals of sensor assembly 24 by means of a controller of motor vehicle 10, which allows motor vehicle 10 to autonomously or automatically adapt to the current traffic situation and behave accordingly.

Sensor assembly 24 is disposed on a front transverse frame part 26 of roof frame 22 and comprises two environment sensors 28, which are each disposed in a corner area of roof module 16 and which are lidar sensors and which are each disposed on a support plate 30, which is attached to roof frame 22. Moreover, sensor assembly 24 comprises a middle sensor unit 32, which is attached to roof frame 22 in the area of a window-like front center cutout 34 of roof frame 22.

Sensor unit 32 comprises a mount 36, which is formed by an aluminum pressure die casting and which serves as a carrier for a radar device 38, which is disposed centrally, and for six cameras 40A, 40B, 42A, 42B, 44A and 44B in the case at hand. To this end, mount 36 is configured in the manner of a bracket and has six seats 46 for cameras 40A, 40B, 42A, 42B, 44A and 44B, which are environment sensors, on its rear side. Seats 46, which are formed during the pressure die casting process, each have a rectangular, in particular square, base area. An electrical insulation element 48 is disposed in each seat 46 for galvanic decoupling, insulation element 48 being a sleeve-like insert having a rectangular or square base area and being made of a PET plastic having a thermal conductivity of 6.5 W/m·K or of a TPE plastic having a thermal conductivity of 2.0 W/m·K. Cameras 40A, 40B, 42A, 42B, 44A and 44B are inserted in such a manner into respective insulation elements 48, which are disposed in seats 46 in a form-fitting manner, that their housings are surrounded by respective insulation elements 48 in a form-fitting manner. The high thermal conductivity of insulation elements 48 couples cameras 40A, 40B, 42A, 42B, 44A and 44B to mount 36 while they are galvanically decoupled from each other.

Insulation elements 48 with the cameras disposed in them are each fixed by means of a resilient clip 50, which is a fixing member and which is screwed to mount 36 by a screw 52 at its lower and which has a tab 54, which engages a slot 56 of mount 36, at its upper end. Clips 50 each have an opening in the shape of an oblong hole, which is engaged by a connecting element of respective cameras 40A, 40B, 42A, 42B, 44A and 44B.

Mount 36, which is symmetrical with respect to a vertical longitudinal center roof plane, has two heat conduction plates 62 on its rear side, to each of which heat pipes 64 or heat conduction pipes are connected, which lead to a heat exchanger 66, which is associated with one of environment sensors 28, which are disposed in the corner areas of roof module 16.

Cameras 40A and 40B form the two camera heads of a stereo camera for detecting a near field. Cameras 42A and 42B form the two camera heads of a stereo camera serving in particular to detect a far field. Camera 44A serves to detect traffic signs, in particular traffic lights that specifically correspond to traffic lights used in Europe in the case at hand. Camera 44B serves to detect traffic signs and traffic lights that are predominantly used in the US.

Connecting mount 36 to heat pipes 64 and thus to heat exchangers 66 allows thermal management of all environment sensors (radar device 38 and cameras 40A, 40B, 42A, 42B, 44A and 44B) installed on mount 36 by means of heat exchangers 66, which are part of a thermal management system.

Mount 36, which is formed by an aluminum pressure die casting, is attached to support 22 via four fixing areas A, B, B, C, which each have thermal decoupling members or are thermal decoupling members.

Figure 6:
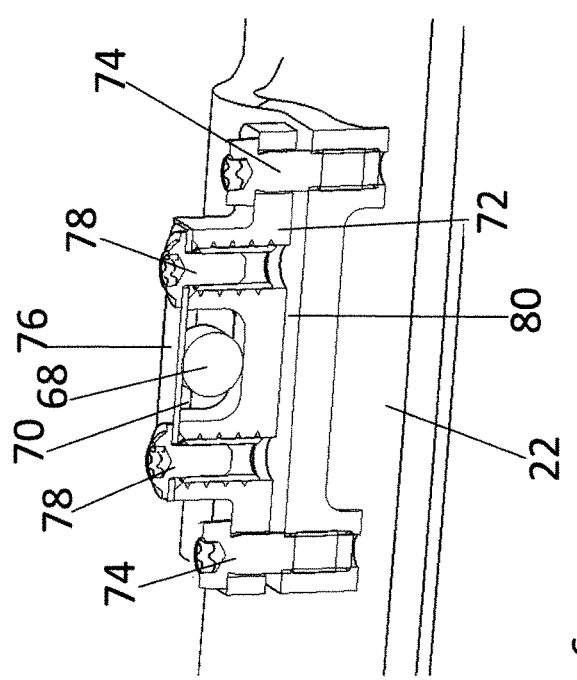
FIG. 6 is a perspective section through a first attachment area A of the sensor assembly of FIG. 2 and the sensor assembly of FIG. 5.

For realizing the thermal decoupling member, a first fixing area A comprises a journal-like bar 68, which has a round cross section and forms an extension of mount 36. As can be seen in FIG. 6 in particular, bar 68 engages a recess 70, which is formed by a pedestal-like fixing element 72, which is screwed to roof frame 22 via two screws 74. Bar 68 is held in recess 70 by means of a securing plate 76, which is screwed to pedestal-like fixing element 72 by screws 78. In order to minimize the heat transfer between fixing element 72, which is made of plastic, and roof frame 22, which may be made of metal, a gap 80, which can be filled with a thermal insulation material, is located between these two elements. Fixing element 72 is made of a plastic material, which can be a glass-fiber-reinforced polyamide material. Recess 70 has an at least approximately rectangular base area, which means that bar 68 has play in the transverse roof direction in recess 70.

Figure 7:
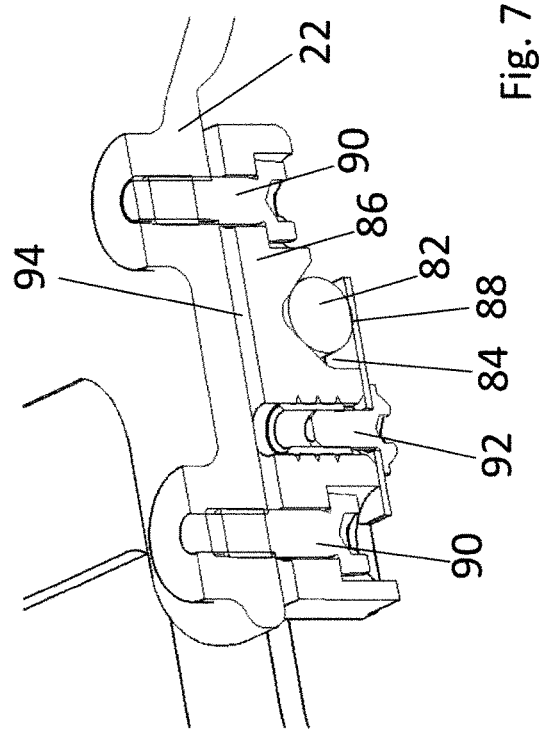
FIG. 7 is a perspective section through an attachment area B of the sensor assembly of FIG. 2 and the sensor assembly of FIG. 5.

Furthermore, mount 36 comprises two bars 82 in fixing areas B for realizing further thermal decoupling members, bars 82 extending in the transverse vehicle direction and each engaging a recess 84 of a pedestal-like fixing element 86, which is also screwed to roof frame 22 by screws 90 (cf. FIG. 7). A securing plate 88, which is screwed to pedestal-like fixing element 86 by a screw 90, holds each bar 82 in recess 84. Each bar 82 has play in the vertical direction and the transverse direction in recess 84 because of the resilient properties of securing plate 88. Fixing element 86 is also attached to roof frame 22 in such a manner that it is spaced apart therefrom via a gap 94, which is in particular filled with a thermal insulation material, with the result that the heat transfer between these two elements is kept low.

Figure 8:
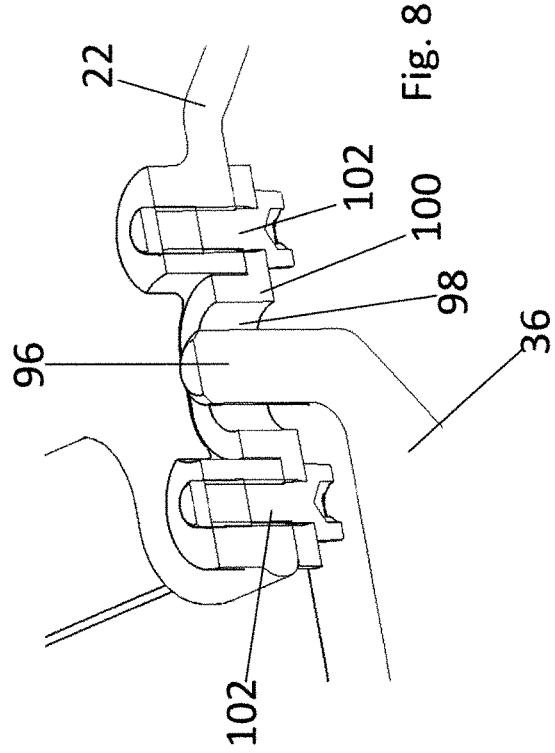
FIG. 8 is a perspective section through an attachment area C of the sensor assembly of FIG. 2 and the sensor assembly of FIG. 5.

In a fixing area C, which is enlarged in FIG. 8, mount 36 has a journal-like bar 96 for realizing another thermal decoupling member, bar 96 protruding upward and engaging a recess 98 of a fixing element 100, which is screwed to the roof frame via screws 102. Fixing element 100 is made of a plastic material, which can also be a glass-fiber-reinforced polyamide material.

The round cross-sectional shape of bars 68, 82 and 96 and the differing cross sections of respective recesses 70, 84 and 98 and the selected materials effectively realize the thermal decoupling members between mount 36 and roof frame 22, which is a support.

Figure 5:
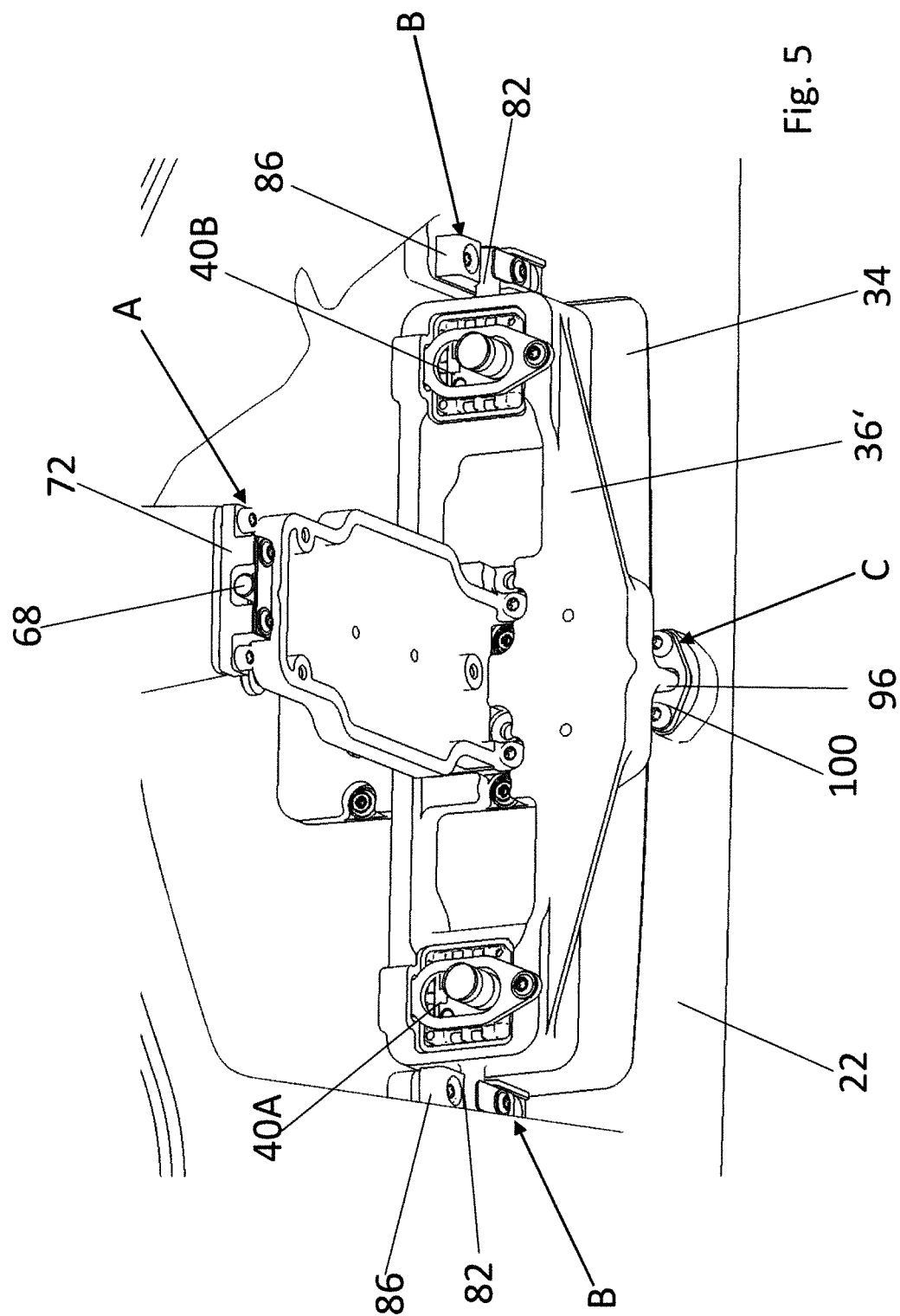
FIG. 5 is an interior view of a front frame part of a roof frame of an alternative embodiment of a vehicle roof.

FIG. 5 shows an alternative embodiment of a mount 36', which is attached to a roof frame 22 and disposed in a window-like cutout 34 of roof frame 22. In the case at hand, mount 36' accommodates two cameras 40A and 40B, which together form a stereo camera.

As in the embodiment described above and shown in FIGS. 1 to 4, mount 36' is attached to roof frame 22 via four fixing areas A, B, B, C, which each form a thermal decoupling member. Fixing area A has a journal 68, which engages a recess 70 of a fixing element 72, which is attached to roof frame 22 via screws 74. Fixing area A corresponds to fixing area A of the exemplary embodiment described above and is illustrated in detail in FIG. 6. Hence, reference is made to the explanations above in this regard in order to avoid repetition.

The two fixing areas B each have a journal-like bar 82, which engages a recess 84 of a pedestal-like fixing element 86, which is screwed to the roof frame. Fixing areas B are illustrated in FIG. 7 and correspond to fixing areas B of the embodiment according to FIGS. 1 to 4 in terms of the fixing method, which is why reference is made to the explanations above in this regard to avoid repetition.

A fourth fixing area C comprises a journal-like bar 96, which engages a recess 98 of a fixing element 100, which is screwed to roof frame 22. This fixing area corresponds to fixing area C of the exemplary embodiment according to FIGS. 1 to 4 and is illustrated in detail in FIG. 8. Reference is made to the explanations above in this regard to avoid repetition.

The invention claimed is:

1. A vehicle roof, the vehicle roof comprising:
   a roof skin, which forms a visible exterior surface of the vehicle roof, and
   a sensor unit having at least two environment sensors for detecting a vehicle environment,
   the sensor unit being disposed below the roof skin and attached to a support and comprising a mount for the at least two environment sensors,
   wherein thermal decoupling members are disposed between the support and the mount.

2. The vehicle roof according to claim 1, wherein the thermal decoupling members comprise at least one bar formed on the mount and engage a recess formed on a fixing element attached to the support.

3. The vehicle roof according to claim 2, wherein the bar is in contact with the fixing element via a linear contact.

4. The vehicle roof according to claim 2, wherein the bar is secured in the recess by a securing plate.

5. The vehicle roof according to claim 2, wherein the fixing element is thermally insulated from the support.

6. The vehicle roof according to claim 5, wherein there is a gap between the fixing element and the support, the gap being filled with a thermal insulation material.

7. The vehicle roof according to claim 2, wherein the bar is disposed in the recess with one- or two-dimensional play.

8. The vehicle roof according to claim 2, wherein the fixing element is made of a plastic material.

9. The vehicle roof according to claim 1, wherein the mount is made of a metallic material.

10. A motor vehicle comprising a vehicle roof according to claim 1.

11. The vehicle roof according to claim 8, wherein the plastic material is a polyamide material.

12. The vehicle roof according to claim 11, wherein the polyamide material is a glass-fiber-reinforced polyamide material.

13. The vehicle roof according to claim 9, wherein the metallic material is an aluminum material.

* * * * *